(12) United States Patent
Hughes

(10) Patent No.: US 8,004,564 B1
(45) Date of Patent: Aug. 23, 2011

(54) AUTOMATED SYSTEMS AND METHODS FOR TESTING INFRARED CAMERAS

(75) Inventor: Gary B. Hughes, Santa Maria, CA (US)

(73) Assignee: Flir Systems, Inc., Wilsonville, OR (US)

( * ) Notice: Subject to any disclaimer, the term of this patent is extended or adjusted under 35 U.S.C. 154(b) by 1403 days.

(21) Appl. No.: 11/490,267

(22) Filed: Jul. 19, 2006

(51) Int. Cl.
- *H04N 5/33* (2006.01)
- *G06K 9/40* (2006.01)
- *G06K 9/00* (2006.01)
- *G06K 9/20* (2006.01)

(52) U.S. Cl. ......... 348/164; 382/266; 382/141; 382/199

(58) Field of Classification Search .................... 348/164
See application file for complete search history.

(56) References Cited

U.S. PATENT DOCUMENTS

| | | | |
|---|---|---|---|
| 6,373,992 B1 * | 4/2002 | Nagao | 382/266 |
| 7,308,153 B1 * | 12/2007 | Wang | 382/262 |
| 2004/0037457 A1 * | 2/2004 | Wengender et al. | 382/141 |
| 2005/0178130 A1 * | 8/2005 | Van Gilder et al. | 62/129 |
| 2005/0238234 A1 * | 10/2005 | Lin | 382/199 |

OTHER PUBLICATIONS

Cressie, N.A., Statistics for Spatial Data, John Wiley & Sons, New York, ISBN: 0 471 00255 0, 1993, 15 pages.
Canny, J.F., A computational approach to edge detection, IEEE Transaction on Pattern Analysis and Machine Intelligence, 1986, vol. 8, No. 6, pp. 679-698.
Beaudet, P.R., Rotational Invariant Image Operators, Int'l Joint Conf. Pattern Recognition, 1978, pp. 579-583.
Fang, J.Q., and Huang, T.S., A Corner Finding Algorithm for Image Analysis and Registration, Proc. AAAI Conf., 1982, pp. 46-49.
Harris, C.G., Determination of Ego-Motion From Matched Points, Proc. Alvey Vision Conf., Cambridge, UK, 1987, pp. 189-192.
Zuniga, O.A. and Haralick, R.M., Corner Detection Using the Facet Model, Proc. Conf. Pattern Recognition and Image Processing, 1983, pp. 30-37.
Dreschler, L., and Nagel, H. H., Volumetric Model and 3D Trajectory of a Moving Car Derived From Monocular TV Frame Sequences of a Street Scene, Int'l Joint Conf. Artificial Intelligence, 1981, pp. 692-697.
Arrebola, F., A. Bandera, P. Camacho, and F. Sandoval, Corner Detection by Local Histograms of Contour Chain Code, Electronic Letters, 1997, vol. 33, No. 21, pp. 1769-1771.
Chen, W.C., and Rockett, P., Bayesian Labelling of Corners Using a grey-Level Corner Image Model, IEEE Int'l Conf. Image Processing, 1997, vol. 1, pp. 687-690.
Davies, E.R., Application of the Generalized Hough Transform to Corner Detection, IEE Proc., 1988, vol. 135, pp. 49-54.
Grigorescu, C, Petkov, N., and Westenberg, M.A., Contour and boundary detection improved by surround suppression of texture edges, Image and Vision Computing, 2004, v. 22, pp. 609-622.

(Continued)

*Primary Examiner* — Christopher Kelley
*Assistant Examiner* — Hee-Young Kim
(74) *Attorney, Agent, or Firm* — Haynes and Boone, LLP

(57) ABSTRACT

Systems and methods are disclosed herein to provide automated testing on infrared image data to detect image quality defects. For example, in accordance with an embodiment of the present invention, image processing algorithms are disclosed to generate an image quality metric that may be compared to one or more thresholds to perform an automated test for image quality defects. For example, the image quality metric may be compared to two thresholds to determine if the corresponding infrared sensor or infrared camera is defective or not due to image quality or requires further manual inspection by test personnel.

17 Claims, 9 Drawing Sheets

OTHER PUBLICATIONS

Ji, Q and Haralick, R.M., Corner Detection With Covariance Propagation, Proc. IEEE Conf. Computer Vision and Pattern Recognition, 1997, pp. 362-367.

Kitchen, L and Rosenfeld, A., Gray Level Corner Detection, Pattern Recognition Letters, 1982, pp. 95-102.

Kohlmann, K., Corner Detection in Natural Images Based on the 2-D Hilbert Transform, Signal Processing, 1996, vol., 48, No. 3, pp. 225-234.

Lai, K.K. and Wu, P.S.Y., Effective Edge-Corner Detection Method for Defected Images, Proc. Int'l Conf. Signal Processing, 996, vol. 2, pp. 1151-1154.

Lee, K.J. and Bien, Z., Grey-Level Corner Detector Using Fuzzy Logic, Pattern Recognition Letters, 1996, vol. 17, No. 9, pp. 939-950.

Mehrotra, R., Nichani, S., and Ranganathan, N., Corner Detection, Pattern Recognition, 1990, vol. 23, No. 11, pp. 1223-1233.

Mokhtarian, F and Suomela, R., Robust Image Corner Detection Through Curvature Scale Space, IEEE Transactions on Pattern Analysis and Machine Intelligence, Dec. 1998, vol. 20, No. 12, pp. 1376-1381.

Mokhtarian, F. and Mackworth, A.K., A Theory of Multscale, Curvature-Based Shape Representation for Planar Curves, IEEE Trans. Pattern Analysis and Machine Intelligence, Aug. 1992, vol. 14, No. 8, pp. 789-805.

Mokhtarian, F. and Suomela, R., Curvature Scale Space for Robust Image Corner Detection, Int'l Conf. Pattern Recognition, 1998, Brisba, Australia, 3 pages.

Nassif, S, Capson, D., and Vaz, A., Robust Real-Time Corner Location Measurement, Proc. IEEE Conf. Instrumentation and Measurement Technology, 1997, pp. 106-111.

Noble, A., Finding Corners, Image and Vision Computing, 1998, vol. 6, pp. 121-128.

Orange, C.M. and Groen, F.C.A., Model Based Corner Detection, Proc. IEEE Conf. Computer Vision and Pattern Recognition, 1993, pp. 690-691.

Paler, K., Foglein, J., Illingworth, J., and Kittler, J., Local Ordered Grey Levels as an Aid to Corner Detection, Pattern Recognition, 1984, vol. 17, No. 5, pp. 535-543.

Press, W.H., Teukolsy, S.A., Vetterling, W.T., and Flannery, B.P., Numerical Recipes in C: The Art of Scientific Computer, Second Edition, Cambridge University Press, New York, 1992, ISBN: 0 521 43108 5, 13 pages.

Press, W.H., Teukolsy, S.A., Vetterling, W.T., and Flannery, B.P., License Information, Numerical Recipes in C: The Art of Scientific Computer, Second Edition, Cambridge University Press, New York, 1992, ISBN: 0 521 43108 5, 3 pages.

Press, W.H., Teukolsy, S.A., Vetterling, W.T., and Flannery, B.P., 2.1 Gauss-Jordan Elimination, Numerical Recipes in C: The Art of Scientific Computer, Second Edition, Cambridge University Press, New York, 1992, ISBN: 0 521 43108 5, pp. 36-41.

Press, W.H., Teukolsy, S.A., Vetterling, W.T., and Flannery, B.P., 7.1 Uniform Deviates, Numerical Recipes in C: The Art of Scientific Computer, Second Edition, Cambridge University Press, New York, 1992, ISBN: 0 521 43108 5, pp. 275-287.

Press, W.H., Teukolsy, S.A., Vetterling, W.T., and Flannery, B.P., 8.4 Indexing and Ranking, Numerical Recipes in C: The Art of Scientific Computer, Second Edition, Cambridge University Press, New York, 1992, ISBN: 0 521 43108 5, pp. 338-341.

Press, W.H., Teukolsy, S.A., Vetterling, W.T., and Flannery, B.P., 8.5 Selecting the Mth Largest, Numerical Recipes in C: The Art of Scientific Computer, Second Edition, Cambridge University Press, New York, 1992, ISBN: 0 521 43108 5, pp. 341-456.

Press, W.H., Teukolsy, S.A., Vetterling, W.T., and Flannery, B.P., 12.2 Fast Fourier Transform (FFT), Numerical Recipes in C: The Art of Scientific Computer, Second Edition, Cambridge University Press, New York, 1992, ISBN: 0 521 43108 5, pp. 504-510.

Press, W.H., Teukolsy, S.A., Vetterling, W.T., and Flannery, B.P., 12.3 FFT of Real Functions, Sine and Cosine Transforms, Numerical Recipes in C: The Art of Scientific Computer, Second Edition, Cambridge University Press, New York, 1992, ISBN: 0 521 43108 5, pp. 510-521.

Press, W.H., Teukolsy, S.A., Vetterling, W.T., and Flannery, B.P., 13.1 Convolution and Deconvolution Using the FFT, Numerical Recipes in C: The Art of Scientific Computer, Second Edition, Cambridge University Press, New York, 1992, ISBN: 0 521 43108 5, pp. 538-545.

Press, W.H., Teukolsy, S.A., Vetterling, W.T., and Flannery, B.P., 15.4 General Linear Least Squares, Numerical Recipes in C: The Art of Scientific Computer, Second Edition, Cambridge University Press, New York, 1992, ISBN: 0 521 43108 5, pp. 671-680.

Press, W.H., Teukolsy, S.A., Vetterling, W.T., and Flannery, B.P., 15.5 Nonlinear Models, Numerical Recipes in C: The Art of Scientific Computer, Second Edition, Cambridge University Press, New York, 1992, ISBN: 0 521 43108 5, pp. 681-689.

Rangarajan, K., Shah, M. and Van Brackle, D., Optimal Corner Detector, Computer Vision, Graphics, and Image Processing, 1989, vol. 48, pp. 90-94.

Shilat, E., Werman, M., and Gdalyahu, Y., Ridge's Corner Detection and Correspondence, Proc. IEEE Conf. Computer Vision and Pattern Recognition, 1997, pp. 976-981.

Smith, S.M., and Brady, J.M., Susan—A New Approach to Low Level Image Processing, Defense Research Agency, Technical Report No. TR95SMS1, Farnborough, England, 1994, pp. 45-78.

Sohn, Kwanghoon, Kim, Jung H., and Alexander, Winser E., Mean Field Annealing Approach to Robust Corner Detection, IEEE Trans. Systems, Man, and Cybernetics, 1998, vol. 28B, No. 1, pp. 82-90.

Trajkovic, Miroslav and Hedley, Mark, Fast Corner Detection, Image and Vision Computing, 1998, vol. 16, No. 2, pp. 75-87.

Tsai, D.M., Boundary Based Corner Detection Using Neural Networks, Pattern Recognition, 1998, vol. 30, No. 1, pp. 85-97.

Wang, H. and Brady, H., A Practical Solution to Corner Detection, Proc. Int'l Conf. Image Processing, 1994, vol. 1, pp. 919-923.

Wu, Z.O., and Rosenfeld, A., Filtered Projections as an Aid to Corner Detection, Pattern Rocognition, 1983, vol. 16, No. 1, pp. 31-38.

Zhang, X., and Zhao, D., Parallel Algorithm for Detecting Dominant Points on Multiple Digital Curves, Pattern Recognition, 1997, No. 2, pp. 239-244.

Cressie, N.A., Statistics for Spatial Data, John Wiley & Sons, New York, ESBN: 0 471 00255 0, 1993, 1. Examples of Point Patterns, 4 pages.

Cressie, N.A., Statistics for Spatial Data, John Wiley & Sons, New York, ESBN: 0 471 00255 0, 2. Models of Spatial Randomness, 81993, 8 pages.

Cressie, N.A., Statistics for Spatial Data, John Wiley & Sons, New York, ESBN: 0 471 00255 0, 3. Testing Spatial Randomness, 1993, 27 pages.

Cressie, N.A., Statistics for Spatial Data, John Wiley & Sons, New York, ESBN: 0 471 00255 0, Appendix to Part I, 10 pages.

Moravec, Hans P., Towards Automatic Visual Obstacle Avoidance, Proc. Int'l Joint Conf. Artificial Intelligence, 1977, p. 584.

* cited by examiner

More Uniform than Random

More Clustered than Random

Random Sample of Nearest-Neighbor Distances

AUTOMATED SYSTEMS AND METHODS FOR TESTING INFRARED CAMERAS

TECHNICAL FIELD

The present invention relates generally to infrared cameras and, more particularly, to techniques for testing infrared cameras.

BACKGROUND

Infrared cameras are well known and increasingly used for a wide variety of applications. As infrared cameras grow in popularity, the ability to manufacture the infrared cameras at high-volume production levels becomes increasingly important.

One limitation with conventional infrared camera manufacturing procedures is that each infrared sensor must be manually inspected to prevent infrared sensors with qualitative visual defects from being sold by the manufacturer. Manual inspection of each infrared sensor is expensive, time consuming, and places a burden on limited production resources (e.g., dedicated personnel and test equipment to sufficiently inspect each infrared sensor). For example, a number of infrared sensor images (e.g., twelve) may need to be viewed by an inspector to determine if a corresponding infrared sensor meets or exceeds the infrared sensor specifications and provides images that do not contain unacceptable visual defects.

Consequently, the ability to provide high-volume, high-quality, and cost-effective infrared camera production is restrained due to the manual inspection requirement. As a result, there is a need for improved techniques for testing infrared cameras

SUMMARY

Systems and methods are disclosed herein to provide automated testing of infrared sensors (e.g., infrared cameras) to detect image quality defects. For example, in accordance with an embodiment of the present invention, image processing algorithms are disclosed to generate an image quality metric, which may be used with one or more thresholds to detect if image quality defects are present in one or more images from the corresponding infrared sensor.

More specifically in accordance with one embodiment of the present invention, a method of testing an infrared sensor includes receiving one or more image frames from the infrared sensor; generating one or more image gradient frames based on the one or more corresponding image frames; generating one or more binary image frames of outliers based on the one or more corresponding image gradient frames; calculating a test statistic for each of the binary image frames; and determining if the infrared sensor is defective by comparing the test statistic to one or more thresholds.

In accordance with another embodiment of the present invention, a test system includes a processor and a memory storing instructions to perform an automated infrared image anomaly detection routine, which includes performing image processing on one or more infrared image frames; providing one or more test statistics based on the image processing; and determining if there are image quality defects in the one or more infrared image frames by comparing the corresponding test statistic to one or more dual thresholds, wherein there are not image quality defects if the test statistic is above a first threshold, there are image quality defects if the test statistic is below a second threshold, and manual inspection is required if the test statistic is between the first and second thresholds for the corresponding infrared image frame.

In accordance with another embodiment of the present invention, a machine-readable medium contains information to provide a device with the capability to perform a method, which includes storing one or more infrared image frames; generating one or more image gradient frames based on the one or more corresponding infrared image frames; generating one or more binary image frames of outliers based on the one or more corresponding image gradient frames; calculating a test statistic for at least one of the binary image frames; and determining if there are image quality defects for the at least one binary image frame by comparing the test statistic to one or more thresholds.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
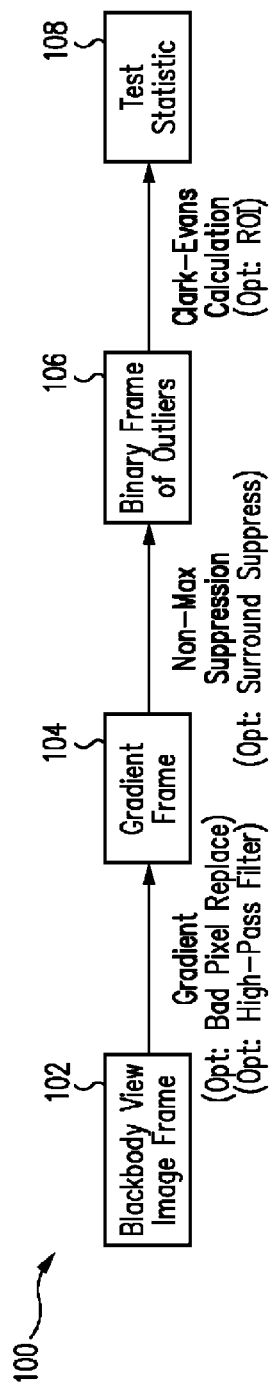
FIG. 1 shows a block diagram illustrating a top level automated test procedure for an infrared sensor in accordance with an embodiment of the present invention.

FIG. 1 shows a block diagram illustrating a top level automated test procedure (ATP) 100 for an infrared sensor in accordance with an embodiment of the present invention. ATP 100 provides an automated routine for detecting image quality defects (e.g., subtle image quality defects) of an infrared sensor, with the automated routine incorporated, for example, into the infrared sensor (or for example infrared camera) manufacturing process to provide a more automated and efficient process for high-volume manufacturing of the infrared sensors.

ATP 100 calculates a gradient frame 104 of an image frame 102 from an infrared sensor, with image frame 102 acquired for example while viewing a uniform blackbody. Image frame 102 may also optionally be processed with various image processing algorithms, such as for example with a bad pixel replacement algorithm or a high-pass filter algorithm. Gradient frame 104 may also optionally be processed with various image processing algorithms (e.g., non-max suppression and/or surround suppression algorithms) to produce the outlier frame 106. The spatial randomness of outliers in an outlier frame 106 based on gradient frame 104 is then assessed.

Image frame 102 would generally be expected to display spatial randomness in the distribution of outliers within outlier frame 106 based on gradient frame 104 if image frame 102 does not contain qualitative visual defects. For example, qualitative visual defects typically manifest themselves as a clumped distribution of outliers in gradient frame 104. A test statistic 108, which for example may be based on a Clark-Evans statistic calculation, is generated to quantify the spatial randomness of outlier distribution in image frame 106 corresponding to gradient frame 104. Additional optional calculations and processing may also be performed and/or the Clark-Evans calculation may also optionally be applied to various regions of interest (ROI) of outlier frame 106.

For example, test statistic 108 based on the Clark-Evans calculation may be normally distributed with a mean of zero and a variance of one. A pattern that displays complete spatial randomness (CSR) would yield a Clark-Evans statistic of zero, with uniform distributions producing positive values of the Clark-Evans statistic, while increasingly clumped distributions producing increasingly negative values.

As set forth further herein, an automated anomaly detection routine is provided based on a sequence of calculations performed to provide a quantitative measure of a given infrared sensor's performance with respect to image quality and compared to one or more performance thresholds.

In general, automated test procedures may be conventionally used to ensure that infrared sensors comply with all specified requirements, such as for example response uniformity, noise-equivalent difference of temperature (NEdT), and operability. However, these conventional test procedures generally would not detect qualitative visual defects (e.g., mountain range, blotch, and other types of visually-detectable defects as discussed further herein) and therefore would pass as acceptable an infrared sensor that a manufacturer would desire to disqualify as defective (e.g., not usable for imaging applications) due to the poor images and image defects provided by the infrared sensor. Consequently, as discussed previously, manual inspection for each infrared sensor is currently performed to prevent infrared sensors with qualitative visual defects from reaching the market.

In contrast in accordance with one or more embodiments of the present invention, automated test procedures are provided to detect visual defects and determine if the corresponding infrared sensor passes or fails the automated inspection or, optionally, if further tests or manual inspection is required. For example in accordance with an embodiment of the present invention, test statistic 108 generally may be a more negative number for images with defects than for images without defects. Therefore, one or more thresholds may be determined (e.g., based on empirical data for one or more image types) for differentiating between good and bad (i.e., defective) infrared sensors or infrared cameras (if testing at the infrared camera level).

Figure 2:
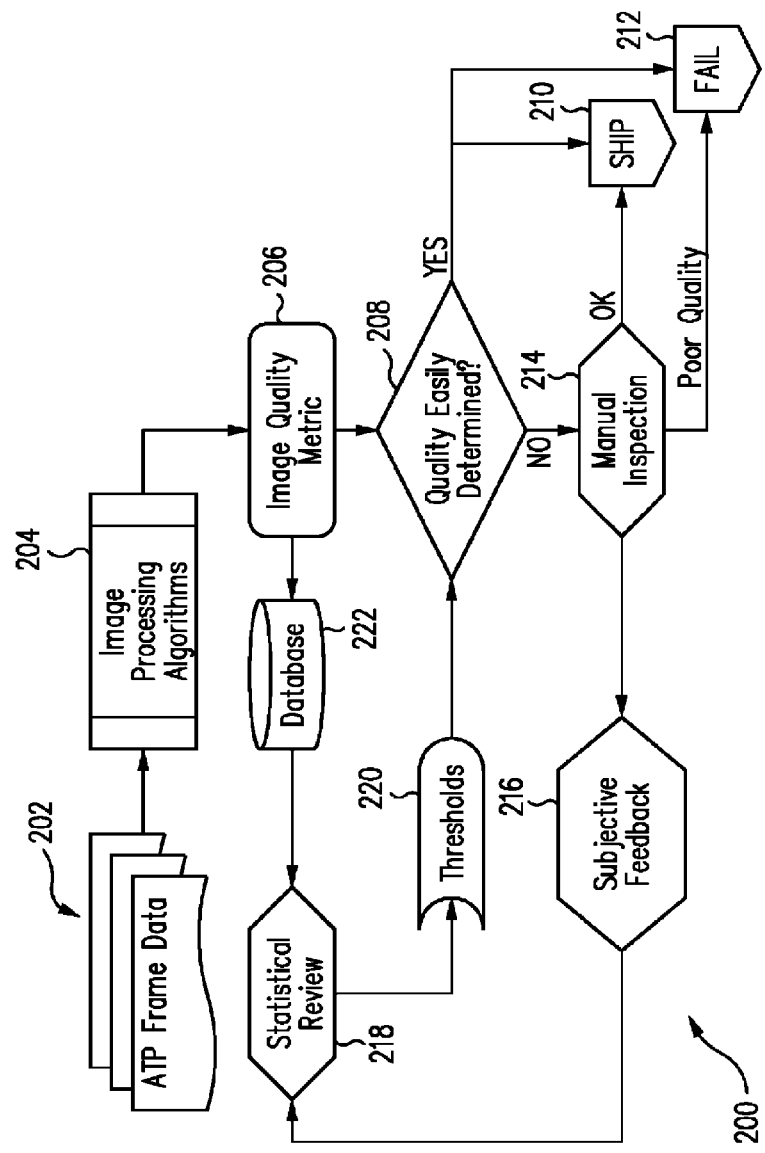
FIG. 2 shows a block diagram illustrating an exemplary automated test procedure for an infrared sensor in accordance with an embodiment of the present invention.

For example, FIG. 2 shows a block diagram illustrating an exemplary automated test procedure (ATP) 200 for an infrared sensor in accordance with an embodiment of the present invention. ATP 200 illustrates an automated test system and method for detecting defective infrared sensors due, for example to subtle image quality defects, and represents an exemplary implementation for ATP 100.

ATP 200 processes one or more image frames 202 (e.g., similar to one or more image frames 102 and labeled ATP frame data) from an infrared sensor (e.g., an infrared camera) with image processing 204 to generate an image quality metric 206. Image frames 202 may represent, for example, one or more uniformity and/or responsivity image frames.

Image processing 204 may represent, for example, a computer (e.g., a processor-based system or other type of logic device) executing image processing software algorithms (or other type of instructions), with the computer also optionally storing image frames 202 and resulting frames of data from the image processing. The computer may also be linked to or maintain a database 222 and perform a statistical review 218, thresholds 220 determination, and/or perform other operations of ATP 200. Alternatively, image processing 204 may represent, for example, a portable machine-readable software medium (e.g., optical or magnetic-based media such as a compact disc, a hard drive, or a flash memory) containing image processing software algorithms for execution by a computer or other type of electronic device. Image processing 204 and image quality metric 206 may generate, for example, gradient frame 104, outlier frame 106, and test statistic 108 as discussed in reference to FIG. 1.

Based on image quality metric 206 and one or more thresholds 220, a determination (208) is made as to whether the infrared sensor that generated image frames 202 is defective. If the infrared sensor passes the automated inspection, then the infrared sensor may be sold, shipped, incorporated into a product or system, or otherwise disposed of as desired by the manufacturer (210). If the infrared sensor fails the automated inspection, then the infrared sensor is deemed defective (212).

For determination 208, a single threshold may be used to determine if an infrared sensor is defective. However, using a single cutoff threshold results in the risk of making both type I (i.e., false positive or erroneous good classification) and type II (i.e., false negative or erroneous defective classification) test errors. In general for automated testing, both types of errors should be minimized.

In accordance with an embodiment of the present invention, a single threshold may be used with a specified margin.

For example, infrared sensors with corresponding image quality metrics 206 above the single threshold plus specified margin are deemed not defective, while infrared sensors with corresponding image quality metrics 206 below the single threshold minus specified margin are deemed defective. For infrared sensors with corresponding image quality metrics 206 that fall within the specified margin around the single threshold may be further tested manually by test personnel (214).

Alternatively in accordance with an embodiment of the present invention, image-specific dual thresholds may be employed, which may minimize type I and type II errors. For example, infrared sensors (or infrared cameras) having image quality metrics 206 below the first threshold are designated as bad (i.e., defective) and no visual inspection is required (212), while infrared sensors having image quality metrics 206 above the second threshold are passed (i.e., as good or not defective) without requiring a manual visual inspection (214) image review.

However, infrared sensors in the overlap area (determined to be between the thresholds) may be further tested manually by test personnel (214). With dual thresholds (or single threshold plus specified margin), the number of cameras that may need to be inspected manually may be drastically reduced as compared to conventional test techniques, with resulting cost savings and increased manufacturing efficiencies. Manual inspection (214) by trained personnel may be performed to determine whether the infrared sensor, which is not clearly defective and not clearly passable, meets the minimum desired level of image quality (210) or does not meet the minimum desired level of image quality (212). Note that the dual thresholds example may be viewed as corresponding to the single threshold with margin example if one of the dual thresholds is equal to the single threshold plus a specified margin and the other dual threshold is equal to the single threshold minus a specified margin.

One or more thresholds 220 (single, single with specified margins, or dual thresholds) may be generated by statistical review 218 based on information provided by subjective feedback 216 from manual inspection 214 and/or based on image quality metric 206. One or more image quality metrics 206 may be stored in database 222 for access by statistical review 218. For example, thresholds 220 may represent one threshold (with or without specified margins) or more than one threshold (e.g., dual thresholds) for each image frame 202 or for two or more image frames 202.

Figure 4:
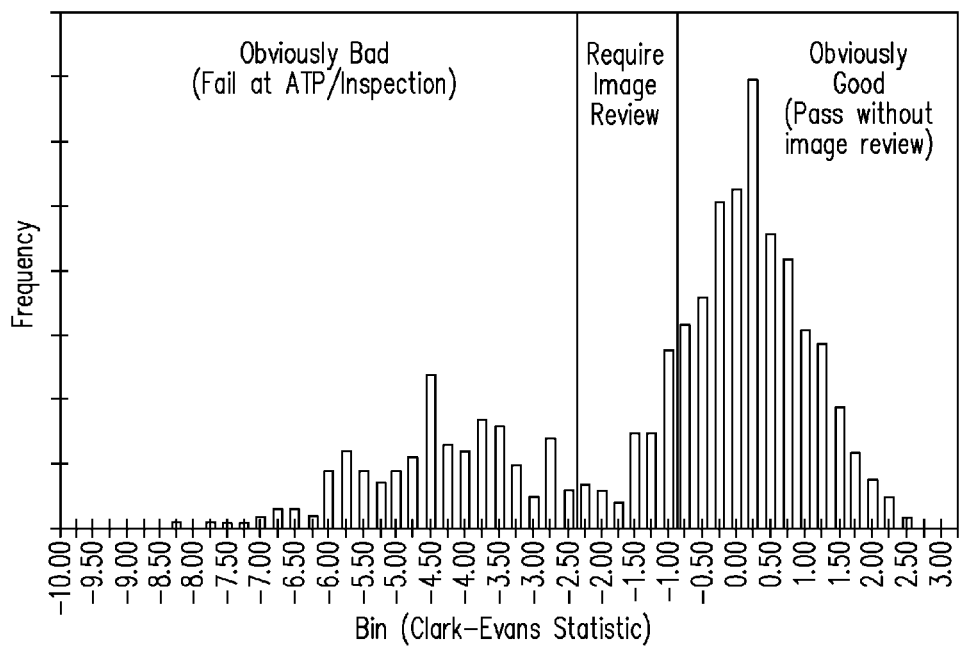
FIG. 4 shows a chart illustrating an exemplary histogram of test statistics for the automated test procedure of FIG. 2 in accordance with an embodiment of the present invention.

Referring briefly to FIG. 4, a chart illustrates an exemplary histogram of test statistics for ATP 200 in accordance with an embodiment of the present invention. The chart shows exemplary test results for a number of infrared sensors, with ATP 200 using dual thresholds (220) for determination (208). As can be seen, the majority of infrared sensors were classified as either obviously good or obviously bad (defective), while only a small number of infrared sensors where deemed to require further image review by manual inspection. Consequently, the implementation of dual thresholds greatly reduced the number of infrared sensors requiring manual inspection.

During the manufacturing process of infrared sensors, statistical review 218 may be periodically performed or continually performed to provide the most accurate thresholds based on subjective feedback 216 and image quality metrics 206 stored in database 222. Statistical review 218 may monitor and adjust thresholds 220 to minimize the occurrence of type I errors (i.e., false positive or erroneous good classification) and type II errors (i.e., false negative or erroneous defective classification). Furthermore, statistical review 218 may adjust thresholds 220 to optimize the level of manual inspection against the occurrence of type I and type II errors from a business or cost analysis or based on infrared sensor specifications and requirements.

Figure 3:
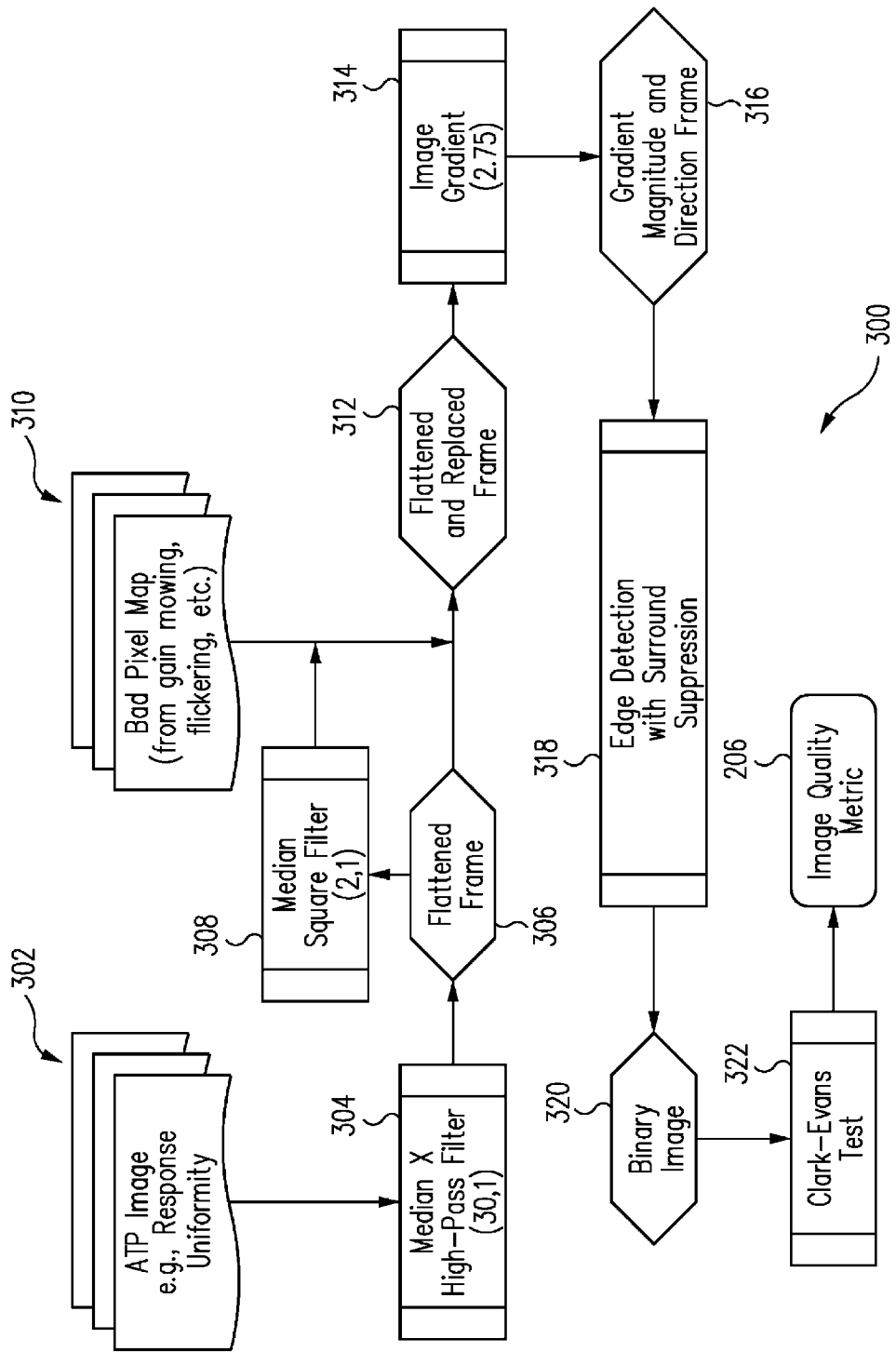
FIG. 3 shows a block diagram illustrating an exemplary image processing algorithm for the automated test procedure of FIG. 2 in accordance with an embodiment of the present invention.

FIG. 3 shows a block diagram illustrating an exemplary image processing algorithm (IPA) 300 for image processing 204 to generate image quality metric 206 of FIG. 2 in accordance with an embodiment of the present invention. In general, IPA 300 provides a gradient calculation, with optional high-pass filtering and/or bad-pixel replacement, a non-maximum suppression calculation, with optional edge-detection enhancements, and a Clark-Evans statistic calculation, optionally within a region of interest to provide image quality metric 206.

Specifically, IPA 300 may optionally apply a high-pass filter 304 (e.g., median X high-pass filter with radius 30 and 2 smoothing passes) to one or more image frames 302 (e.g., image frames 202 generated for response uniformity from a blackbody view) to provide a flattened image frame 306. A median square filter (e.g., with radius 2 and 1 smoothing pass) 308 may optionally be applied along with a bad pixel map 310 to replace bad pixels and provide a flattened and replaced image frame 312. An image gradient (e.g., with radius 2.75) 314 is then generated to provide a gradient magnitude and direction frame 316 as shown.

Non-maximum suppression 318, with optional edge detection and surround suppression, is applied to gradient magnitude and direction frame 316 to provide a binary image frame 320. A Clark-Evans test 322 (optionally within a region of interest) is then applied to binary image frame 320 to generate image quality metric 206, which is used as described for ATP 200.

As noted above, high-pass filter 304 may be applied prior to the gradient calculation (e.g., gradient 314 and gradient magnitude and direction frame 316). High-pass filter 304 may optionally be implemented and represent any type of high-pass filter technique, including for example a Median X kernel, a Gaussian kernel mean smoothing, a Gaussian kernel median smoothing, a square kernel mean smoothing, a square kernel median smoothing, a Median 'Cross' kernel smoothing, a FFT-based high-pass spatial filtering, and a smoothing spline subtraction.

As an example in accordance with an embodiment of the present invention, high-pass filter 304 may use a median calculation, with an 'X' pattern for the kernel around each pixel of the infrared sensor instead of all the pixels in a surrounding square as would be understood by one skilled in the art.

Figure 5A:
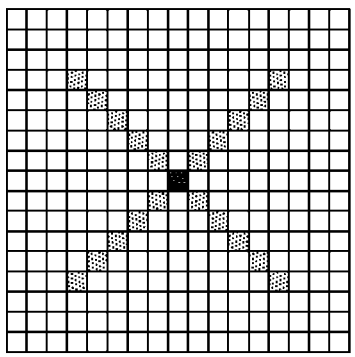
FIGS. 5a and 5b show block diagrams illustrating an exemplary high-pass filter implementation for the automated test procedure of FIG. 2 in accordance with one or more embodiments of the present invention.
Figure 5B:
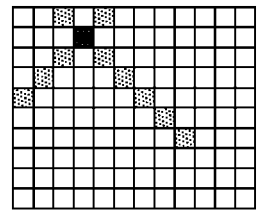

For example, FIGS. 5a and 5b show block diagrams illustrating an exemplary Median 'X' kernel pattern and an exemplary 'Median X' algorithm (summarized below) accepts parameters for kernel radius and number of smoothing passes over the image (MED_X_KERN_RAD, MED_X_N_PASSES). The kernel radius is the number of pixels in each branch of the 'X' pattern, i.e., if the radius is 3, then the 'X' pattern (in the image interior) will consist of 13 pixels. The number of passes indicates the number of times to apply the 'Median X' algorithm to the image, with the output from one iteration on the image being the input to the algorithm on the subsequent pass. Thus, for each pixel in an image, the corresponding pixel in the 'smoothed' image is calculated as the median of the pixels in an 'X' pattern in the original image (including the center pixel). Near the edges of the image, the number of pixels in the kernel may be reduced, as illustrated in FIG. 5b.

The infrared sensor may be any type of infrared radiation detecting device, including a complete infrared camera or system. For example, the infrared sensor may be based on a microbolometer structure, which is typically fabricated on a monolithic silicon substrate to form an array of microbolometers, with each microbolometer functioning as a pixel to produce a two-dimensional image. The change in resistance of each microbolometer is translated into a time-multiplexed electrical signal by circuitry known as the read out integrated circuit (ROIC). The combination of the ROIC and the microbolometer array are commonly known as a microbolometer focal plane array (FPA).

As an example, optimization of images from a microbolometer-based infrared sensor indicates that a Median 'X' kernel radius of 30, with 2 passes, may produce the best filter for anomaly detection. The median frame is calculated and then subtracted from the original image frame to produce a type of high-pass filtered image. Exemplary model parameters for the high-pass filter 304 are shown below.

MED_X_KERN_RAD
Default Value: 30
Description: median X kernel radius in pixels
Limits: 1≦MED_X_KERN_RAD≦~30 (upper limit determined by image size)
MED_X_N_PASSES
Default Value: 2
Description: median X filter number of passes
Limits: 1≦MED_X_KERN_PASS≦~5 (no real upper limit)

An exemplary median square filter algorithm for median square filter 308 may be used to replace any pixels previously identified as bad by conventional methods (e.g., bad pixel map 310). As an example, a square pattern around the central pixel may be used as the kernel. The Median Square filter algorithm also accepts parameters for kernel radius and number of passes (MED_SQ_KERN_RAD, MED_SQ_N_PASSES), with exemplary values of these parameters being a kernel radius of 2 pixels with 1 pass. Exemplary model parameters for median square filter 308 are shown below.

MED_SQ_KERN_RAD
Default Value: 2
Description: median square kernel radius in pixels (used for bad-pixel replacement)
Limits: 1≦MED_SQ_KERN_RAD≦~10 (upper limit determined by image size)
MED_SQ_N_PASSES
Default Value: 1
Description: median square filter number of passes (used for bad-pixel replacement)
Limits: 1≦MED_SQ_KERN_PASS≦~10 (no real upper limit)

The resulting image (flattened and replaced frame 312), which has been filtered and pixel-replaced, is then provided for the gradient calculation (image gradient 314). Various algorithms exist for calculating the gradient of an image, such as algorithms based on finite-difference calculations between adjacent pixels (e.g., Sobel). However, these algorithms are sensitive to image noise and discretization errors, and may not be optimal. In accordance with an embodiment of the present invention, a Gaussian smoothing function may be applied to the image when the gradient is calculated in order to mitigate the effects of noise and discretization. The standard method of convolution may be used, the image 'partial derivative' along each row and down each column may be calculated, and the image gradient estimated from the partial derivatives.

For example, consider the image frame to be a function of two spatial variables $f(x, y)$. Then the gradient of $f$ can be calculated by convolving $f$ with the gradient of a Gaussian smoothing function. The Gaussian smoothing function is parameterized with an extinction coefficient ($\sigma$) which determines the effective width of the kernel.

$$\nabla f(x, y) = f * \nabla g_\sigma(x, y) \text{ where } g_\sigma(x, y) = \frac{1}{2\pi\sigma^2}\exp\left(-\frac{x^2 + y^2}{2\sigma^2}\right)$$

In the current context, it is difficult to apply the convolution efficiently in two dimensions, so the gradient may be estimated by using 'partial derivatives' along the rows and columns.

$$\nabla_x f(x, y) = \left(f * \frac{\partial g_\sigma}{\partial x}\right)(x, y) \text{ and } \nabla_y f(x, y) = \left(f * \frac{\partial g_\sigma}{\partial y}\right)(x, y)$$

In the current application, the convolution of $f$ with the Gaussian smoothing function g is calculated using the Fourier Transform Convolution Theorem as would be understood by one skilled in the art. As an example, the one-dimensional Gaussian function, and its derivative are as follows.

$$g_\sigma(s) = \frac{1}{\sigma\sqrt{2\pi}}\exp\left(-\frac{(s-\mu)^2}{2\sigma^2}\right) \text{ and}$$

$$\frac{dg_\sigma(s)}{ds} = \frac{-(s-\mu)}{\sigma^3\sqrt{2\pi}}\exp\left(-\frac{(s-\mu)^2}{2\sigma^2}\right)$$

Because the convolution is calculated with an FFT, some manipulation of the input data for each row and column is required. A detrending step is applied first. A best-fit line (linear least squares) is determined for the (1–d) input row- or column-data. The input data is then replaced by its residual from the best-fit line. Additionally, some 'padding' is typically required. For example, the number of input data values to the FFT routine must be a (positive) integer power of 2 and, if the number of data values is not an integer power of 2, the data may be padded with zeros at each end to fill out the data set to the nearest integer power of 2. The convolution is calculated with the power-of-2 number of data values, and the 'partial derivative' row or column is extracted from the middle of the convolution output array.

The gradient magnitude and direction are estimated from the 'partial derivatives' by the following.

$$\|\Delta f(x,y)\| = \sqrt{\Delta_x f(x,y)^2 + \Delta_y f(x,y)^2} \text{ and}$$

$$DIR[\nabla f(x, y)] = a\tan\left(\frac{\nabla_y f(x, y)}{\nabla_x f(x, y)}\right)$$

The radius of the gradient kernel is one of the model parameters (GRAD_KERN_RAD) and the exemplary default value is 2.75 pixels. As an example, only the gradient magnitude may be considered or additional edge-detection or feature enhancement algorithms may be employed to utilize the gradient direction. Exemplary model parameters for image gradient 314 and gradient magnitude and direction frame 316 are shown below.

GRAD_KERN_RAD

Default Value: 2.75

Description: gradient smoothing kernel radius in pixels

Limits: 1.0≦GRAD_KERN_RAD≦~10 (upper limit determined by image size)

For non-maximum suppression 318 in accordance with an embodiment of the present invention, an exemplary approach for anomaly detection employs a modified Canny edge detection algorithm. In a blackbody view, for example, a defect-free image would have a homogenous gradient function, where the gradient vector is pointing directly upward at every point in the image. An image with defects, however, would not produce a homogenous gradient. At any point where an anomaly exists, the gradient at that point in the image would diverge from vertical. Thus, large-scale anomalies (e.g., mountain range or blotch) typically manifest themselves as a clumped spatial distribution of outliers in the gradient frame.

Non-maximum suppression 318 may be used to identify points in the image where the gradient diverges from vertical, and in particular where the divergent points lie in some sort of pattern such as an edge and, thus, edge detection routines may provide the desired result. For example, non-maximum suppression 318 takes the gradient magnitude frame as input and produces a binary output frame, where gradient outliers are identified and all other pixels are suppressed.

The Canny edge detection algorithm provides a two-level approach with (1) non-maximum suppression, where gradient values below a low threshold are suppressed and values above a high threshold are maintained, and then (2) hysteresis thresholding, where gradient values between the low and high thresholds are subjected to additional criteria. For example, the additional criteria would maintain gradient values only if they represent a local maximum with respect to surrounding pixels (which would make them part of an edge).

In accordance with an embodiment of the present invention, the threshold limits may be different for every image. For example, this permits the analysis of images from different ATP tests on the same infrared sensor (or infrared camera) and also permits the analysis of images from many different infrared sensors. The thresholds for example may be determined, as would be understood by one skilled in the art, from a histogram of gradient magnitude values.

As an example, a histogram of gradient magnitude values may be generated from the gradient frame. The lower limit of the histogram is always zero, since gradient magnitude is always non-zero. The upper limit of the histogram may be determined from the maximum gradient value in the image. The number of bins in the histogram is a model parameter (N_BINS), and the default value is 50 bins. Exemplary model parameters are shown below.

N_BINS

Default Value: 50

Description: number of bins in the gradient histogram

Limits: 25≦N_BINS≦~100 (upper limit determined by image size)

LO_HIST

Default Value: 2.75

Description: lower histogram threshold factor

Limits: 0≦LO_HIST≦~3.0 (upper limit determined by gradient histogram)

HI_HIST

Default Value: 3.50

Description: upper histogram threshold factor

Limits: LO_HIST<HI_HIST≦~5.0 (upper limit determined by gradient histogram)

To determine cutoff thresholds, a continuous model for example may be fitted to the discrete histogram data, with threshold limits determined from the continuous curve. For example, referring briefly to FIGS. 7a-7d, exemplary histograms of gradient magnitude values, along with the corresponding continuous models, are illustrated for various exemplary types of image defects or image test responses (blotch, mountain range, uniformity, and responsivity, respectively). A histogram of image gradient magnitude values is useful for non-maximum suppression with hysteresis thresholding. As illustrated in FIGS. 7a-7d, a continuous curve is fitted to the histogram data, which may then be used to determine thresholds.

For example, the continuous model for a gradient magnitude histogram is determined by non-linear least squares curve fit with the following function.

$$f(x) = A \cdot x \cdot \exp(-B \cdot x^2)$$

Values for the coefficients A and B may be determined numerically, as would be understood by one skilled in the art. The continuous curve may then be used to establish threshold values by using the curve peak and point of inflection as reference points (e.g., as in a standard normal curve). The curve peak and inflection point may be determined from the following.

$$\text{peak: } x = \frac{1}{\sqrt{2B}} \quad \text{infection point: } x = \frac{3}{\sqrt{6B}}$$

The distance from the peak to the inflection point may be used in the same sense as in a standard normal distribution (i.e., the distance from the peak to the inflection point is exactly one standard deviation). For example, the low and high cutoff thresholds may be calculated from the continuous curve peak and inflection point as follows, where 0≦LO_HIST<HI_HIST are factors that determine the distances away from the peak where each threshold lies.

$$\text{low: } x = \frac{1}{\sqrt{2B}} + \text{LO\_HIST} * \left( \frac{\sqrt{2} - \sqrt{6}}{2\sqrt{6}} \right)$$

$$\text{high: } x = \frac{1}{\sqrt{2B}} + \text{HI\_HIST} * \left( \frac{\sqrt{2} - \sqrt{6}}{2\sqrt{B}} \right)$$

Values of the gradient magnitude below the low cutoff are immediately suppressed, while values above the high cutoff are always retained. Values between the two cutoffs, for example, may only be maintained if they represent a local maximum with respect to the surrounding pixels. For example, a default value for LO_HIST and HI_HIST may each be 3.50.

The Clark-Evans statistic, from Clark-Evan test 322 (FIG. 3), provides a numerical measure of the spatial randomness of a distribution of points within a specified domain. This statistic is normally distributed with mean zero and variance one (standard normal distribution). A pattern that displays complete spatial randomness (CSR) would yield a Clark-Evans statistic of zero.

Figure 6A:
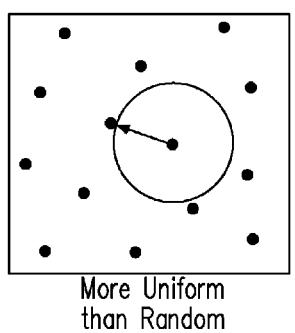
FIGS. 6a-6c show block diagrams illustrating exemplary infrared sensor defect patterns in accordance with an embodiment of the present invention.
Figure 6B:
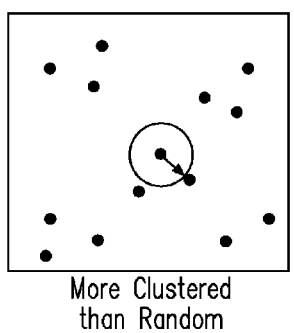

For example, FIGS. 6a and 6b generally depict spatial patterns that do not display CSR. Distributions that are more uniform than random (e.g., as illustrated in FIG. 6a) would tend to produce positive values of the Clark-Evans statistic, while more clumped distributions (e.g., as illustrated in FIG. 6b) would tend to produce increasingly negative values.

As an example, defect-free images should be expected to produce random or uniform patterns from the spatial distribution of gradient magnitude outliers. Images with defects should produce more clustered or clumped patterns. Consequently, the Clark-Evans statistic will effectively separate images with defects from images without defects, with any overlap for example resolved with manual inspection.

Clark-Evans test 322 may be based on nearest-neighbor distances. For each point in a binary image pattern, there is a unique straight-line distance that denotes the minimum distance to the closest point (or points) in the pattern. For a set of points within the image frame domain, let the complete set of nearest-neighbor distances be denoted as follows.

$$D = \{D_1, D_2, K, D_n\}$$

The average point density within the image frame domain is just the total number of points divided by the area of the frame as in the following.

$$\lambda = \frac{n}{nRows \cdot nCols}$$

The point density becomes a reference point for determining what the average nearest neighbor distance should be if the spatial distribution of points are randomly dispersed within the image. The calculated 'average' of nearest-neighbor distances in the binary image should be comparable to the expected value for a given point density, as set forth for the Clark-Evans test for spatial randomness. However, it may not be sufficient to just calculate the average nearest neighbor distance from the complete set of distances, because the distance values in the complete set are not independent as the two points that are close together will likely have the same nearest-neighbor distance. Thus, in order to make a valid comparison between the expected value and the measured value, the central limit theorem may be used. Random samples of size m, where m<n, are taken from the set D of nearest neighbor distances, and the sample set is averaged as shown below.

$$\bar{d}_m = \frac{1}{m} \cdot \sum_{i=1}^{m} d_i$$

Figure 6C:
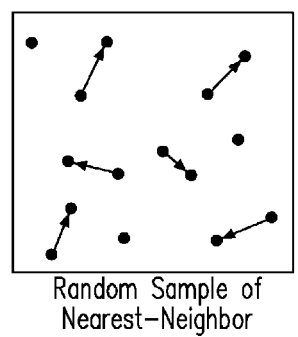
Figure 7A:
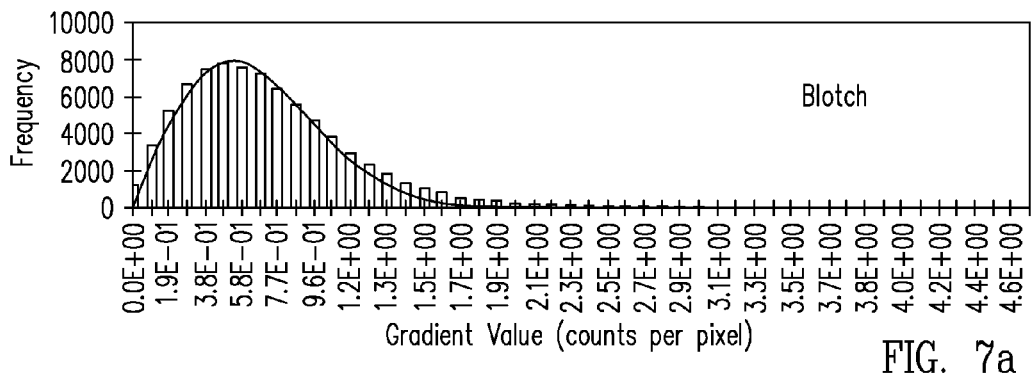
FIGS. 7a-7d show charts illustrating exemplary histograms of image gradient values for various types of infrared sensor blackbody images in accordance with one or more embodiments of the present invention.
Figure 7B:
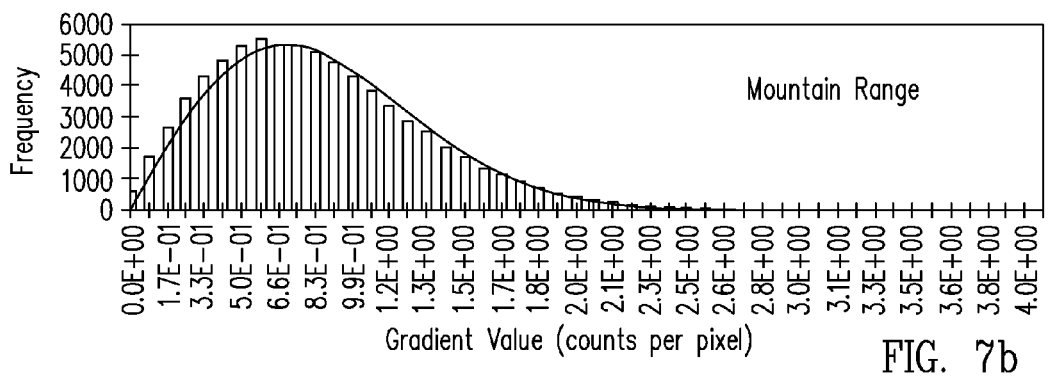
Figure 7C:
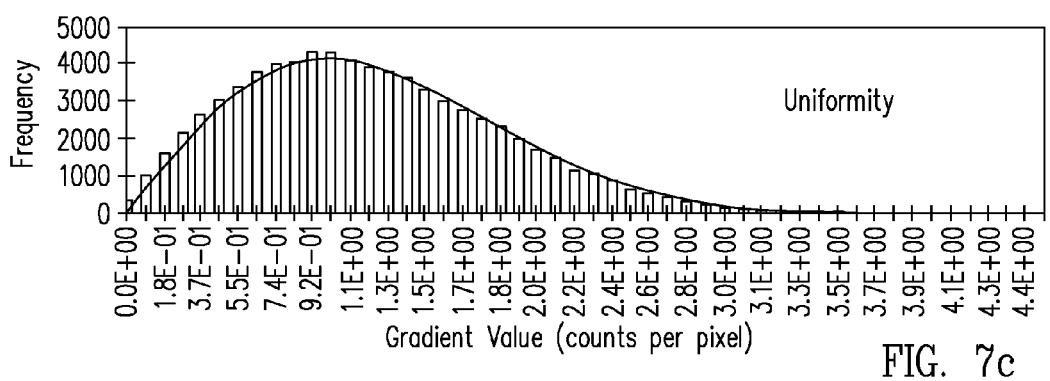
Figure 7D:
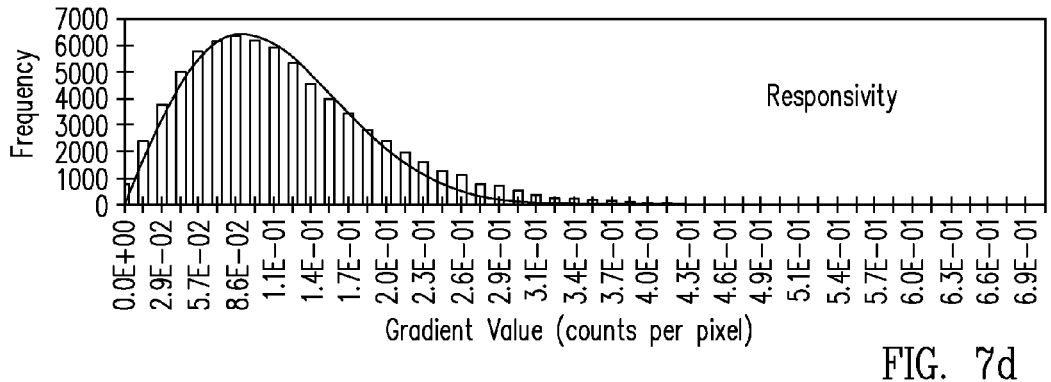

This produces a random variable $\bar{d}_m$ that is normally distributed according to the central limit theorem. A series of random samples are made, as illustrated in FIG. 6c, and the mean of the sample averages is used for comparison with the expected value. Thus, as shown for FIG. 6c, the Clark-Evans statistic is based on a characterization of nearest-neighbor distances, where random samples from the complete set of nearest-neighbor distances are made, with the distribution of sample means being normal according to the central limit theorem.

The following conversion below creates a standard normal variate from the mean of sample averages, which is the Clark-Evans statistic. The number of random sub-samples is a model parameter (N_RAND_ITER), with for example a current default value of 50 iterations. For each of the sampling iterations, for example, ten percent of the points in the binary image frame are sampled. Thus for this example, the value of m is ten percent of the number of (non-suppressed) points in the binary image. In other words, ten percent of the points are sampled, with this sampling repeated N_RAND_ITER times.

$$z_m = \frac{\bar{d}_m - \frac{1}{2\sqrt{\lambda}}}{\sqrt{\frac{4-\pi}{4\pi m\lambda}}} \sim N(0, 1)$$

Because the smoothing function is susceptible to edge effects, an additional parameter may be employed (N_BORDER) to allow a border frame around the region of interest for Clark-Evans calculations. This parameter is the width of the border, in number of pixels, with for example a current default value of 30. Points in the border area of the binary image are ignored for purposes of calculating the Clark-Evans statistic.

The final model parameter (DIST_TABLE_SIZE) is the number of elements in the distance table used for nearest-neighbor calculations. The distance table is used to speed calculation time of nearest neighbor and may be used as a spiral-outward search for the nearest neighbor, storing the distances of pixels in every location in the outward path. This distance table may slow compilation time, but may provide run-time efficiency. Exemplary model parameters for Clark-Evans Test 322 are shown below.

N_RAND_ITER
Default Value: 50
Description: number of random iterations for Clark-Evans
Limits: 25≦N_RAND_ITER≦~250 (no real upper limit)
N_BORDER
Default Value: 30
Description: number of pixels to ignore around the border in Clark-Evans
Limits: 0≦N_BORDER≦~30 (upper limit determined by image size)
DIST_TABLE_SIZE
Default Value: 5525
Description: the number of elements in the distance table for nearest-neighbor (Clark-Evans)
Limits: this is determined by pre-set size of distance table, which may be hard-coded In accordance with one or more embodiments of the present invention, automated test procedures as set forth herein were applied to various exemplary infrared sensor images with and without defects (e.g., defects that may not be detected by conventional automated procedures that provide infrared sensor test metrics such as uniformity). For example, FIGS. 8a-8d show exemplary infrared sensor images for processing by ATP 200 of FIG. 2 in accordance with one or more embodiments of the present invention.

Figure 8A:
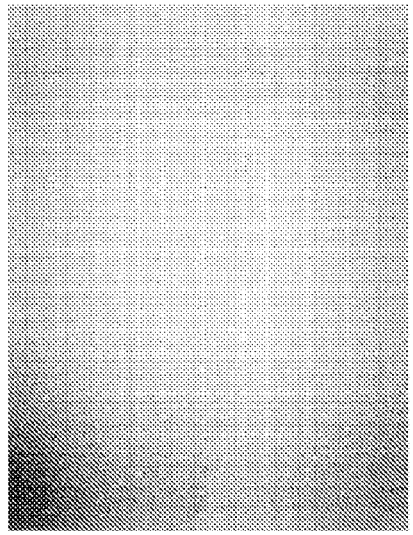
FIGS. 8a-8d show exemplary infrared sensor images for processing by the automated test procedure of FIG. 2 in accordance with one or more embodiments of the present invention.
Figure 8B:
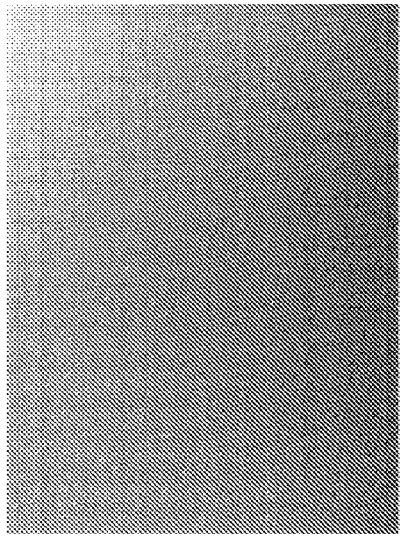

Specifically, FIG. 8a shows a responsivity map from infrared sensor-level testing, which illustrates a defect caused by debris on the infrared sensor window (this type of defect also referred to herein as a blotch). FIG. 8b shows an offset uniformity map from an infrared camera-level ATP illustrating a 'mountain range' defect. This defect is difficult to detect with uniformity tests, because the signal difference across the demarcation defect is only a few counts. This type of defect may arise from thermal non-uniformities in the chamber during the calibration process.

Figure 8C:
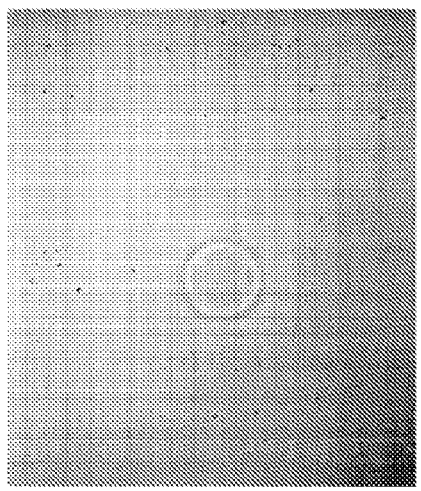
Figure 8D:
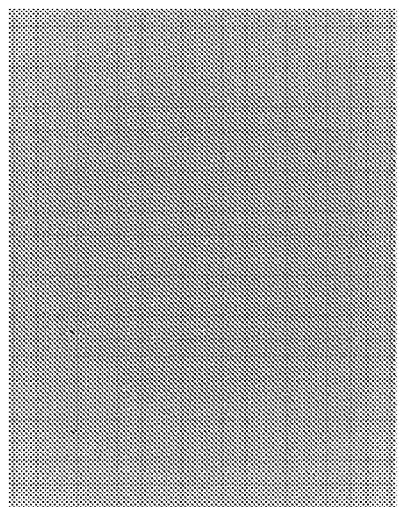

FIG. 8c shows a responsivity uniformity map'from infrared sensor-level testing illustrating no apparent defects. The cluster in the upper-left portion of the image is smaller than what may generally be considered an image quality defect for the infrared sensor. FIG. 8d shows a high-scene corrected uniformity map from infrared camera-level ATP illustrating no apparent visual defects. Generally defect-free images, such as shown in FIGS. 8c and 8d were used as controls to test ATP 200.

Figure 9A:
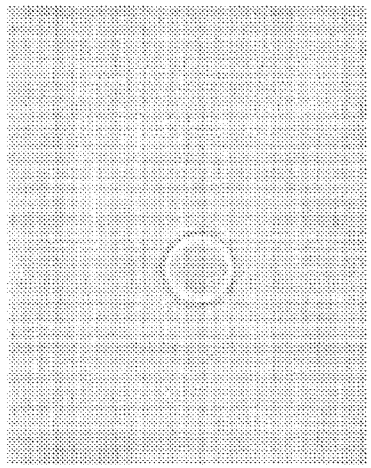
FIGS. 9a-9d show an exemplary infrared sensor image and exemplary processing by the automated test procedure of FIG. 3 in accordance with one or more embodiments of the present invention.
Figure 9C:
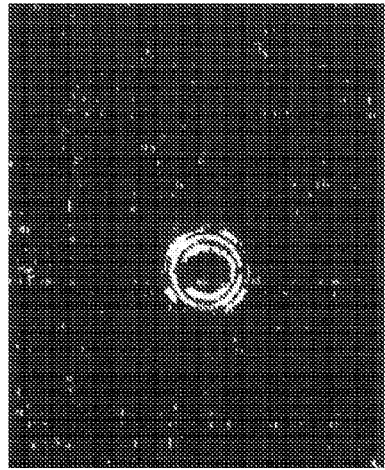
Figure 9B:
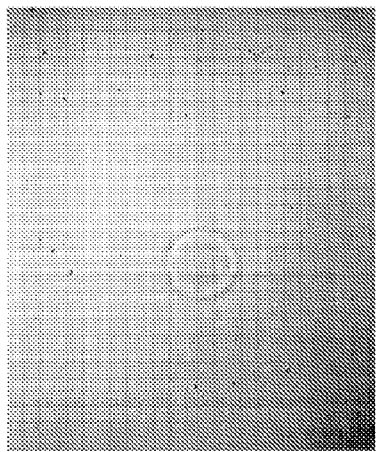

FIGS. 9a-9d show exemplary ATP processing (e.g., ATP 200) of the infrared sensor image of FIG. 8a in accordance with one or more embodiments of the present invention. For example, FIG. 9a shows the raw responsivity map, which typically would pass quantitative tests for uniformity and would require manual inspection to detect the infrared sensor defect. FIG. 9b shows a flattened image frame produced by applying a high-pass filter to the raw responsivity map, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

Figure 9D:
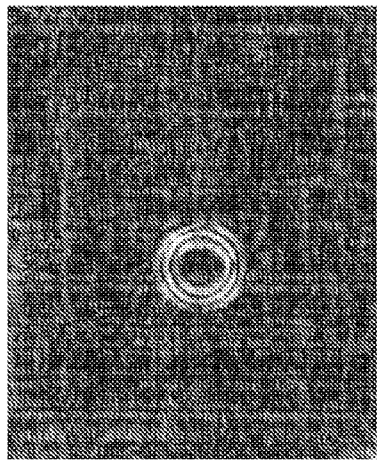

FIG. 9c shows the gradient magnitude calculated from the flattened image frame, with outliers in this frame identified using a modified Canny edge detection algorithm to produce a binary frame. FIG. 9d shows the final binary image after non-maximum suppression with hysteresis thresholding. The value of the Clark-Evans statistic for this binary image may be −9.0 (border frame of 30 pixels).

Figure 10B:
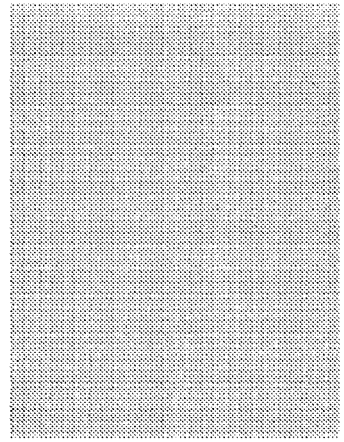
FIGS. 10a-10d show an exemplary infrared sensor image and exemplary processing by the automated test procedure of FIG. 3 in accordance with one or more embodiments of the present invention.
Figure 10D:
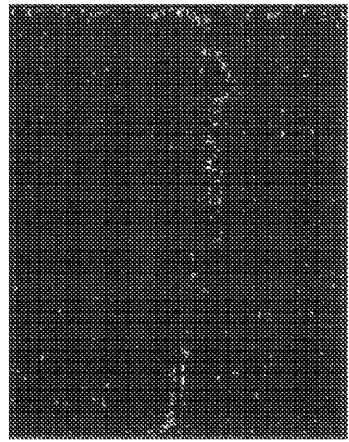
Figure 10A:
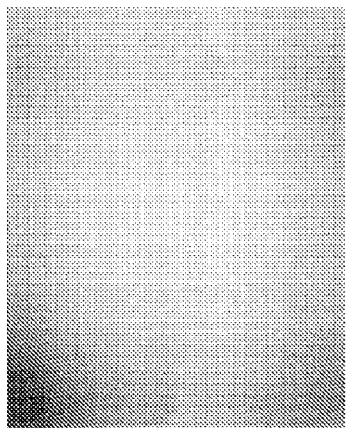

FIGS. 10a-10d show exemplary ATP processing (e.g., ATP 200) of the infrared sensor image of FIG. 8b in accordance with one or more embodiments of the present invention. For example, FIG. 10a shows a raw offset uniformity map with the mountain range defect, which has obvious quality defects but typically would pass conventional quantitative tests for uniformity. FIG. 10b shows a flattened image frame produced by applying a high-pass filter to the raw offset uniformity map, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

Figure 10C:
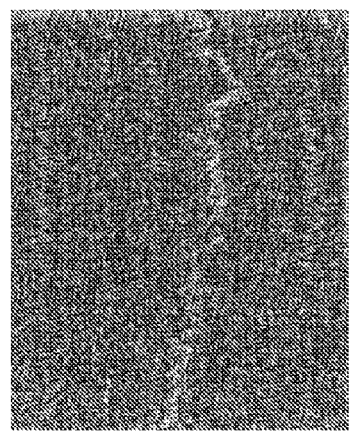

FIG. 10c shows the gradient magnitude calculated from the flattened image frame, with outliers in this frame identified using a modified Canny edge detection algorithm to produce a binary frame. FIG. 10d shows the final binary image after non-maximum suppression with hysteresis thresholding. The value of the Clark-Evans statistic for this binary image may be −5.5 (border frame of 30 pixels).

Figure 11B:
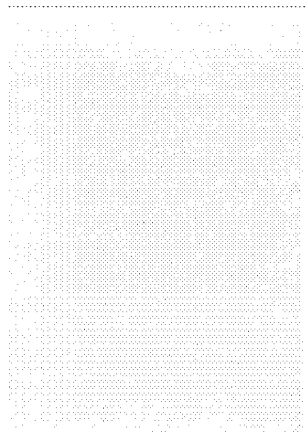
FIGS. 11a-11d show an exemplary infrared sensor image and exemplary processing by the automated test procedure of FIG. 3 in accordance with one or more embodiments of the present invention.
Figure 11D:
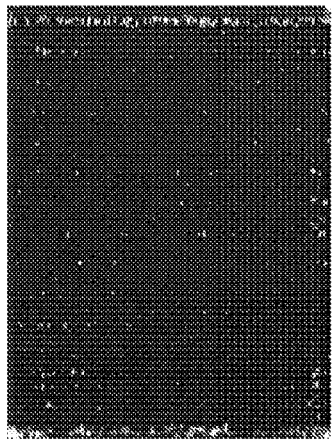
Figure 11A:
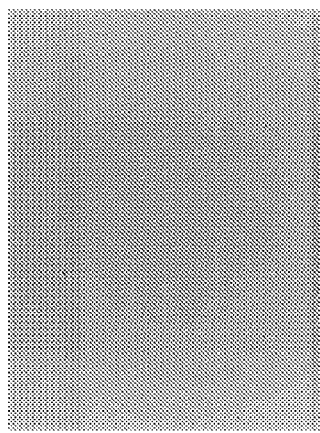

FIGS. 11a-11d show exemplary ATP processing (e.g., ATP 200) of the infrared sensor image of FIG. 8c in accordance with one or more embodiments of the present invention. For example, FIG. 11a shows an offset uniformity map with no apparent quality defects (e.g., generally the clusters in the image are too small to be detected). FIG. 11b shows a flattened image frame produced by applying a high-pass filter to the responsivity map of FIG. 11a, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

Figure 11C:
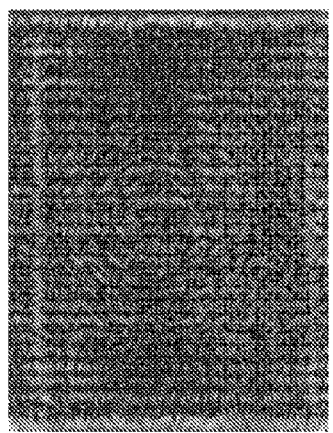

FIG. 11c shows the gradient magnitude calculated from the flattened image frame, with outliers in this frame identified using a modified Canny edge detection algorithm to produce a binary frame. FIG. 11d shows the final binary image after non-maximum suppression with hysteresis thresholding. The value of the Clark-Evans statistic for this binary image may be −2.0 (border frame of 30 pixels) and may be subject to manual inspection (e.g., per the exemplary chart in FIG. 4).

Figure 12B:
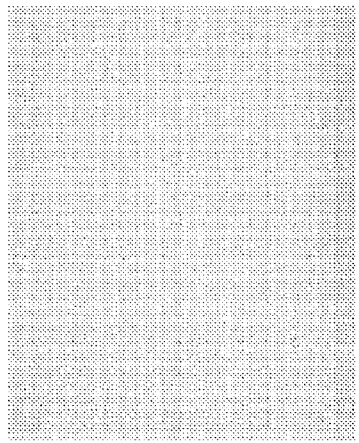
FIGS. 12a-12d show an exemplary infrared sensor image and exemplary processing by the automated test procedure of FIG. 3 in accordance with one or more embodiments of the present invention.
Figure 12D:
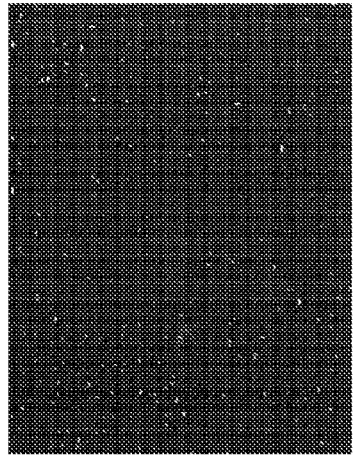
Figure 12A:
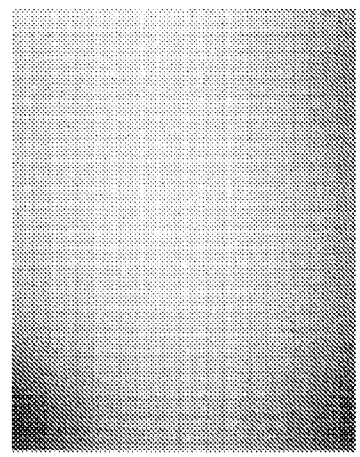

FIGS. 12a-12d show exemplary ATP processing (e.g., ATP 200) of the infrared sensor image of FIG. 8d in accordance with one or more embodiments of the present invention. For example, FIG. 12a shows a raw offset uniformity map (FIG. 8d) with no apparent quality defects and may be used as a control to determine whether the algorithms and image quality metric flag this image as suspect or defective. FIG. 12b shows a flattened image frame produced by applying a high-pass filter to the raw offset uniformity map, with the image produced using a median-X kernel low-pass filter with a radius of 30 pixels and 2 passes. The low-pass frame is subtracted from the original image to produce a high-pass frame. A bad pixel map was also used, with bad pixels replaced with median-square kernel values having a radius of 4 pixels and 1 pass.

Figure 12C:
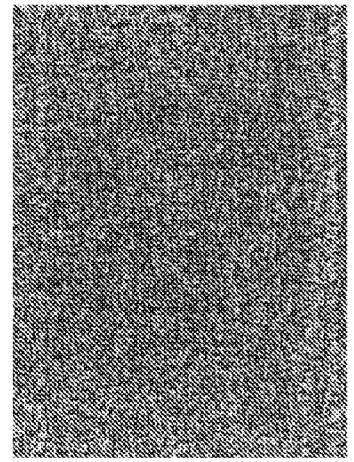

FIG. 12c shows the gradient magnitude calculated from the flattened image frame, with outliers in this frame identified using a modified Canny edge detection algorithm to produce a binary frame. FIG. 12d shows the final binary image after non-maximum suppression with hysteresis thresholding. The value of the Clark-Evans statistic for this binary image may be 0.0 (border frame of 30 pixels) and would pass as obviously good (e.g., per the exemplary chart in FIG. 4).

Systems and methods are disclosed herein to provide automated testing of infrared sensors to detect image quality defects. For example, in accordance with an embodiment of the present invention, image processing algorithms are disclosed to generate an image quality metric (e.g., a Clark-Evans statistic). The image quality metric may be used, in conjunction with pre-determined thresholds, to detect the presence of image quality defects (or lack thereof).

As an example in accordance with an embodiment of the present invention, the thresholds for the image quality metric may be established from production data to minimize type I (False Positive) and type II (False Negative) errors. The production data may be coupled with subjective feedback regarding image quality to establish or adjust the thresholds (e.g., production threshold determination with iterative improvement scheme based on production statistics and subjective image quality feedback).

For example in accordance with an embodiment of the present invention, dual thresholds may be employed to clearly indicate based on the image quality metric whether the infrared sensor for the corresponding image is either clearly defective or clearly defect free. If clearly defect free, the infrared camera can be shipped without manual inspection. If clearly defective, the infrared camera can be prevented from being shipped (e.g., sold) and no manual inspection is required.

As some overlap of the image quality metric between good and bad images is expected, the image processing-algorithms may be used to reduce the number of infrared cameras that are subject to manual inspection. If the image quality metric value falls between the thresholds, then the infrared camera may be manually inspected.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of testing an infrared sensor, the method comprising:
   receiving one or more image frames from the infrared sensor;
   generating one or more image gradient frames based on the one or more corresponding image frames;
   generating one or more binary image frames of outliers based on the one or more corresponding image gradient frames;
   calculating a test statistic for each of the binary image frames, wherein the calculating the test statistic comprises calculating a Clark-Evans statistic based on a characterization of nearest-neighbor distances, wherein random samples from a complete set of nearest-neighbor distances are made and with a distribution of a sample being normal according to a central limit theorem; and determining if the infrared sensor is defective by comparing the test statistic to one or more thresholds.

2. The method of claim 1, wherein the one or more thresholds comprise dual thresholds, and wherein the infrared sensor passes based on the test statistic relative to a first threshold, fails based on the test statistic relative to a second threshold, and requires manual inspection if between the first and second thresholds.

3. The method of claim 2, wherein for each of the binary image frames there are corresponding dual thresholds, and wherein the image frames are based on responsivity or uniformity data.

4. The method of claim 1, wherein the generating one or more image gradient frames further comprises:
applying a Gaussian smoothing function;
applying a high-pass filter to the image frames; and
applying a median square filter to replace bad pixel data.

5. The method of claim 4, wherein the high-pass filter comprises a median-x high-pass filter.

6. The method of claim 1, wherein the generating one or more binary image frames of outliers further comprises applying a Canny edge detection algorithm having non-maximum suppression and hysteresis thresholding, wherein hysteresis thresholds are determined from one or more histograms of gradient magnitude values.

7. The method of claim 1, wherein the testing is automated and determines whether the infrared sensor has image quality defects.

8. The method of claim 1, wherein the one or more thresholds are based on an iterative statistical review based on a database of the test statistics and manual inspection subjective feedback.

9. A test system comprising:
a processor;
a memory storing instructions to perform an automated infrared image anomaly detection routine comprising:
performing image processing on one or more infrared image frames;
storing the one or more infrared image frames;
providing one or more test statistics based on the image processing, wherein the providing comprises:
generating one or more image gradient frames based on the one or more corresponding infrared image frames;
generating one or more binary image frames of outliers based on the one or more corresponding image gradient frames; and
calculating the one or more test statistics for the one or more binary image frames, wherein the calculating the test statistic comprises calculating a Clark-Evans statistic based on a characterization of nearest-neighbor distances, wherein random samples from a complete set of nearest-neighbor distances are made and with a distribution of a sample being normal according to a central limit theorem;
determining if there are image quality defects in the one or more infrared image frames by comparing the corresponding test statistic to one or more dual thresholds, wherein there are not image quality defects if the test statistic is above a first threshold, there are image quality defects if the test statistic is below a second threshold, and manual inspection is required if the test statistic is between the first and second thresholds for the corresponding infrared image frame.

10. The test system of claim 9, wherein the generating one or more image gradient frames further comprises:
applying a Gaussian smoothing function;
applying a high-pass filter to the image frames; and
applying a median square filter to replace bad pixel data.

11. The test system of claim 10, wherein the generating one or more binary image frames of outliers further comprises applying a Canny edge detection algorithm having non-maximum suppression and hysteresis thresholding, wherein hysteresis thresholds are determined from one or more histograms of gradient magnitude values.

12. The test system of claim 9, wherein the automated infrared image anomaly detection routine further comprises performing a statistical review based on a database of the test statistics and manual inspection subjective feedback of the infrared image frames to determine the one or more dual thresholds.

13. A non-transitory computer-readable medium containing non-transitory information to provide to a device with the capability to perform, based on the information, a method comprising:
storing one or more infrared image frames;
generating one or more image gradient frames based on the one or more corresponding infrared image frames;
generating one or more binary image frames of outliers based on the one or more corresponding image gradient frames;
calculating a test statistic for at least one of the binary image frames, wherein the calculating the test statistic comprises calculating a Clark-Evans statistic based on a characterization of nearest-neighbor distances, wherein random samples from a complete set of nearest-neighbor distances are made and with a distribution of a sample being normal according to a central limit theorem; and
determining if there are image quality defects for the at least one binary image frame by comparing the test statistic to one or more thresholds.

14. The computer-readable medium of claim 13, wherein the one or more thresholds comprise dual thresholds, and wherein there are not image quality defects if the test statistic is above a first threshold, there are image quality defects if the test statistic is below a second threshold, and manual inspection is required if the test statistic is between the first and second thresholds.

15. The computer-readable medium of claim 14, wherein the generating one or more image gradient frames further comprises:
applying a Gaussian smoothing function;
applying a high-pass filter to the image frames; and
applying a median square filter to replace bad pixel data.

16. The computer-readable medium of claim 14, wherein the generating one or more binary image frames of outliers further comprises applying a Canny edge detection algorithm having non-maximum suppression and hysteresis thresholding, wherein hysteresis thresholds are determined from one or more histograms of gradient magnitude values.

17. The computer-readable medium of claim 14, wherein the method comprises an automated infrared image anomaly detection routine which further comprises performing a statistical review based on a database of the test statistics and manual inspection subjective feedback of the infrared image frames to determine the one or more thresholds.

\* \* \* \* \*

UNITED STATES PATENT AND TRADEMARK OFFICE
CERTIFICATE OF CORRECTION

PATENT NO. : 8,004,564 B1
APPLICATION NO. : 11/490267
DATED : August 23, 2011
INVENTOR(S) : Gary B. Hughes It is certified that error appears in the above-identified patent and that said Letters Patent is hereby corrected as shown below:

In column 8, between lines 51 and 55, delete the formula and insert the following:

$$\|\nabla f(x,y)\| = \sqrt{\nabla_x f(x,y)^2 + \nabla_y f(x,y)^2} \quad \text{and}$$

Signed and Sealed this
Seventeenth Day of April, 2012

David J. Kappos
*Director of the United States Patent and Trademark Office*